United States Patent
Balasubramanian et al.

(10) Patent No.: US 8,346,917 B2
(45) Date of Patent: Jan. 1, 2013

(54) UNIFIED ENTERPRISE LEVEL METHOD AND SYSTEM FOR ENHANCING APPLICATION AND STORAGE PERFORMANCE

(75) Inventors: Sridhar Balasubramanian, Wichita, KS (US); Ken Fugate, Wichita, KS (US); Richard Stehno, Portland, OR (US); Mark Pokorny, Silverton, OR (US)

(73) Assignee: Netapp. Inc., Sunnyvale, CA (US)

( * ) Notice: Subject to any disclaimer, the term of this patent is extended or adjusted under 35 U.S.C. 154(b) by 165 days.

(21) Appl. No.: 12/492,147

(22) Filed: Jun. 26, 2009

(65) Prior Publication Data

US 2010/0332646 A1 Dec. 30, 2010

(51) Int. Cl.
G06F 15/173 (2006.01)
(52) U.S. Cl. .............. 709/224; 710/8; 710/36; 711/100; 702/182
(58) Field of Classification Search .................. 711/114, 711/170; 707/999.01; 709/221, 223; 718/104; 714/6, 47.2; 702/182; 703/2; 710/8
See application file for complete search history.

(56) References Cited

U.S. PATENT DOCUMENTS

| | | | | |
|---|---|---|---|---|
| 5,890,014 | A * | 3/1999 | Long | 710/8 |
| 6,820,035 | B1 * | 11/2004 | Zahavi | 702/182 |
| 7,080,229 | B2 * | 7/2006 | Manbert et al. | 711/170 |
| 7,210,073 | B1 * | 4/2007 | Landwehr et al. | 714/47.2 |
| 7,594,006 | B2 * | 9/2009 | Rolia et al. | 709/223 |
| 7,606,843 | B2 * | 10/2009 | Alexander et al. | 707/999.01 |
| 8,131,519 | B2 * | 3/2012 | Wood et al. | 703/2 |
| 2005/0289296 | A1 * | 12/2005 | Balasubramanian | 711/114 |
| 2007/0033430 | A1 * | 2/2007 | Itkis et al. | 714/6 |
| 2008/0163234 | A1 * | 7/2008 | Stronge et al. | 718/104 |
| 2010/0100611 | A1 * | 4/2010 | Hatasaki et al. | 709/221 |

* cited by examiner

*Primary Examiner* — Dustin Nguyen
(74) *Attorney, Agent, or Firm* — Haynes and Boone, LLP (57) ABSTRACT

A unified enterprise level method and system for enhancing a performance of applications and storage subsystems in a storage network are disclosed. In one embodiment, a method for enhancing the performance of the storage network having applications and storage subsystems includes collecting performance data associated with the applications and the storage subsystems, and generating performance profiles for a set of combinations of the applications and the storage subsystems implemented in the storage network based on the performance data. The method also includes receiving desired performance criteria for an application of the storage network, and applying a performance profile to configure the application and a storage subsystem assigned to the application substantially similar to the desired performance criteria.

20 Claims, 8 Drawing Sheets

UNIFIED ENTERPRISE LEVEL METHOD AND SYSTEM FOR ENHANCING APPLICATION AND STORAGE PERFORMANCE

FIELD OF TECHNOLOGY

Embodiments of the present invention relate to the field of storage network. More particularly, embodiments of the present invention relate to a configuration and management technique of the storage network.

BACKGROUND

A storage network comprises a number of applications and a number of storage subsystems. When the storage network grows in size, it may become difficult to configure and/or manage individual combinations of the applications and the storage subsystems. For instance, when a new application is introduced to the storage network, a storage subsystem may be manually or automatically assigned for the application based on an initial set up of the storage network, where the initial set up may be based on static data (e.g., in a spread sheet) captured from the storage network over a period of time.

Therefore, once the combination of the application and the storage subsystem is configured, there may be no means to dynamically enhance working of the application and storage subsystem even if there is an environmental change in any part of the storage network. Furthermore, the static data may not be adequate to effectively manage the storage network since they cannot be used to dynamically monitor or analyze conditions of the applications and storage subsystems.

SUMMARY

A unified enterprise level method and system of a server in a storage network for enhancing a performance of applications and storage subsystems in the storage network are disclosed. In one aspect, a method includes collecting performance data associated with the applications and the storage subsystems. The method further includes generating a plurality of performance profiles for a set of combinations of the applications and the storage subsystems implemented in the storage network based on the performance data. The method also includes receiving desired performance criteria for an application of the storage network, and applying one of the performance profiles to configure the application and a storage subsystem assigned to the application substantially similar to the desired performance criteria.

In addition, the method includes generating a performance attribute associated with each combination of the applications and the storage subsystems by analyzing the performance data. Moreover, the method includes monitoring the set of combinations of the applications and the storage subsystems by comparing a subset of the performance data with threshold values which correspond to the subset of the performance data.

In another aspect, a server system in a storage network for enhancing a performance of the storage network with applications and storage subsystems includes a performance data collector engine configured for collecting performance data associated with the applications and the storage subsystems. The server system also includes a performance modeling module, coupled to the performance data collector engine, configured for generating a plurality of performance profiles for a set of combinations of the applications and the storage subsystems implemented in the storage network based on the performance data. Further, the server system includes a performance sizing module coupled to the performance modeling module and configured for receiving desired performance criteria for an application of the storage network and for applying a performance profile to configure the application and a storage subsystem assigned to the application substantially similar to the desired performance criteria.

Furthermore, the server system includes a performance monitor module coupled to the performance data collector engine and configured for monitoring the set of combinations of the applications and the storage subsystems by comparing a subset of the performance data with threshold values which correspond to the subset of the performance data. Moreover, the server system includes a performance analyzer module coupled to the performance data collector engine and configured for generating performance attributes associated with each combination of the applications and the storage subsystems by analyzing the performance data. In addition, the server system includes an internal database for storing the performance profiles.

The methods and systems disclosed herein may be implemented in any means for achieving various aspects, and other features will be apparent from the accompanying drawings and from the detailed description that follow.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A unified enterprise level method and system for enhancing a performance of applications and storage subsystems in a storage network are disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
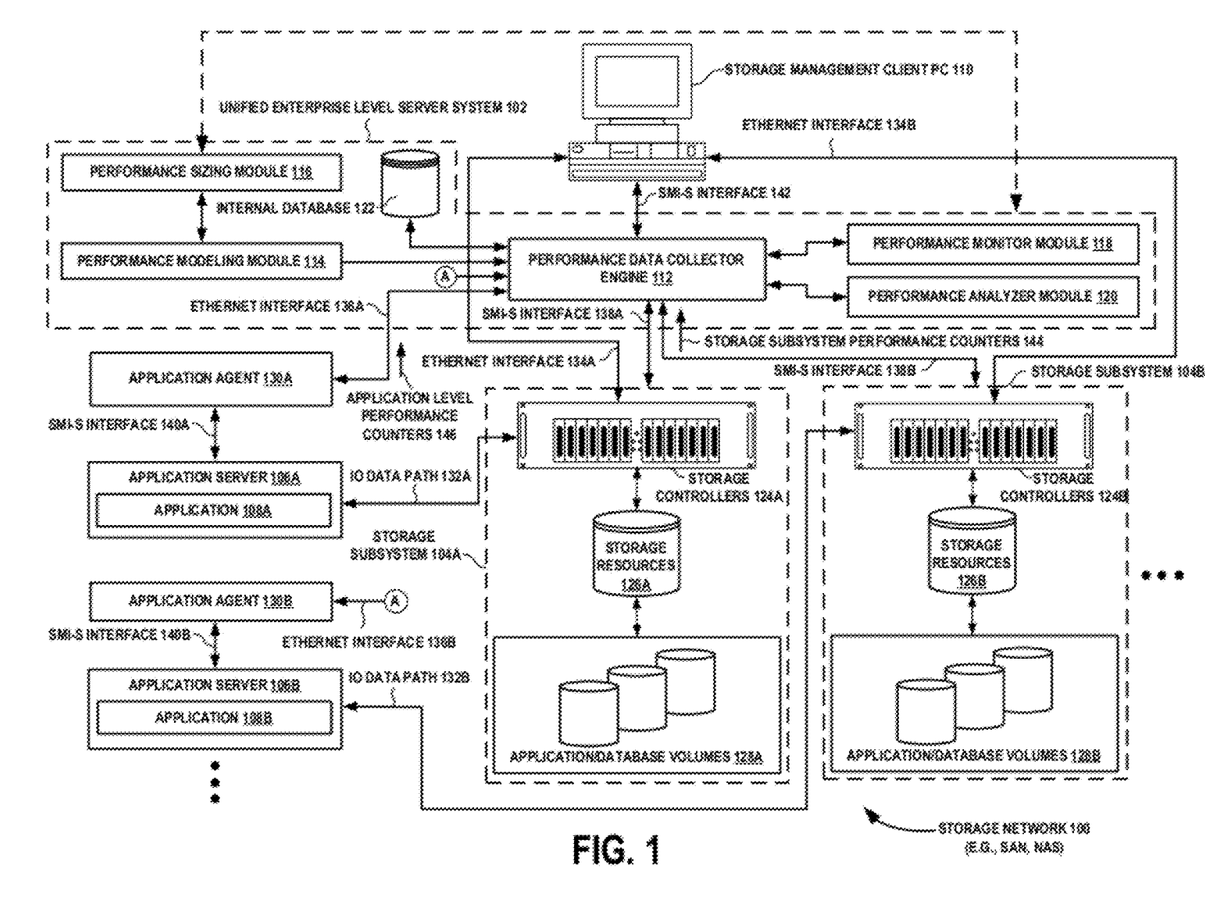
FIG. 1 illustrates a storage network with an exemplary unified enterprise level server system for enhancing application and storage subsystem performance, according to one embodiment.

FIG. 1 illustrates a storage network 100 with an exemplary unified enterprise level server system 102 for enhancing application and storage subsystem performance, according to one embodiment. The storage network 100 may be a storage area network (SAN) or a network attached storage (NAS). As illustrated in FIG. 1, the storage network 100 includes the unified enterprise level server system 102, storage subsystems 104A-N, application servers 106A-N and a storage management client personal computer (PC) 110. It is appreciated that the notation "A-N" denotes all the number of multiple components available in the storage network 100. Thus, the storage subsystems 104A-N may indicate the storage subsystem 104A, the storage subsystem 104B and other storage subsystems in the storage network 100 although only the storage subsystem 104A and the storage subsystem 104B are shown in FIG. 1.

The unified enterprise level server system 102 (e.g., a footprint server) includes a performance data collector engine 112, a performance modeling module 114, a performance sizing module 116, a performance monitor module 118, a performance analyzer module 120 and an internal database 122. The storage subsystems 104A-N include storage controllers 124A-N, storage resources 126A-N and application/database volumes 128A-N, respectively. The applications servers 106A-N host applications 108A-N, respectively, where the applications 108A-N may comprise database applications, email applications, backup applications, NAS applications, server applications, and the like. The storage management client PC 110 may be a computer system configured to manage, configure and maintain the storage subsystems 104A-N.

The storage controllers 124A-N may be coupled to the application servers 106A-N via input/output (IO) data paths 132A-N according to a configuration of the storage network 100. It is appreciated that the IO data paths 132A-N can be implemented differently from FIG. 1 based on a given configuration of the storage network 100 which combines individual applications 108A-N with their counterpart storage subsystems 104A-N of the storage network 100. Additionally, the storage controllers 124A-N are coupled to the storage management client PC 110 via Ethernet interfaces 134A-N, respectively. Further, the performance data collector engine 112 of the unified enterprise level server system 102 is coupled to the storage controllers 124A-N via storage management initiative-specification (SMI-S) interfaces 138A-N. An SMI-S interface is a storage standard interface developed and maintained by storage networking industry association that enables broad interoperability among heterogeneous storage vendor systems. The performance data collector engine 112 is also coupled to application agents 130A-N via the Ethernet interfaces 136A-N, which in turn are coupled to the application servers 106A-N via the SMI-S interfaces 140A-N. Additionally, the performance data collector engine 112 is coupled to the storage management client PC 110 via the SMI-S interface 142.

In operation, the performance data collector engine 112 collects the performance data associated with the applications 108A-N and the storage subsystems 104A-N. In one embodiment, the performance data collector engine 112 polls the storage controllers 124A-N via the SMI-S interface 138A-N for collecting the performance data associated with the storage subsystems 104A-N. For example, the performance data collector engine 112 polls the storage controllers 124A-N in real time based on a desired scanning frequency set by a user (e.g., a system administrator). The performance data may include storage subsystem performance counters 144 governing a performance of each of the storage subsystems 104A-N, as will be illustrated in FIG. 2.

In another embodiment, the performance data collector engine 112 polls the application servers 106A-N using the application agents 130A-N for collecting performance data associated with the applications 108A-N. The performance data associated with the applications 108A-N may include application level performance counters 146 governing a performance of each of the applications 108A-N, as will be illustrated in FIG. 3.

Further, the performance modeling module 114, coupled to the performance data collector engine 112, generates performance profiles for a set of combinations of the applications 108A-N and the storage subsystems 104A-N implemented in the storage network 100. In one example embodiment, the performance modeling module 114 generates the performance profiles based on the collected performance data. Further, the performance modeling module 114 stores the generated performance profiles in the internal database 122.

In one embodiment, the performance modeling module 114 provides recommendations on a type or model of a storage subsystem (e.g., the storage subsystem 104A, the storage subsystem 104B, or the like) best suited for a given application (e.g., the application 108A, the application 108B, or the like) based on the performance profiles. Alternatively, the performance modeling tool 114 provides recommendations on a type of an application best suited for a given storage subsystem based on the stored performance profiles. In another embodiment, the performance modeling module 114 provides a "mockup" functionality using the stored performance profiles when one or more parameters governing the performance of the application and/or the storage subsystem are changed. In one example embodiment, the "mockup" functionality facilitates prediction of a desired performance level for a combination of the application and the storage subsystem pair.

The performance sizing module 116 is configured to receive desired performance criteria for an application of the storage network 100 from a user. In one example embodiment, the desired performance criteria may include a performance level for a combination of the application and a storage subsystem, a storage capacity of the storage subsystem, a loading capability of the combination, etc. The performance sizing module 116 recommends configuration parameters to the user for configuring the application and the storage subsystem substantially similar to the desired performance criteria. In one example embodiment, the performance sizing module 116 generates the configuration parameters for the application and the storage subsystem by applying one of the performance profiles.

For example, the configuration parameters associated with the storage subsystem may include a storage share capacity, a redundant array of independent disks (RAID) level, a preferred host side link speed, a preferred switch negotiation rate, a preferred target side link speed, a preferred number of host and back-end ports/channels, a preferred network speed (e.g., for internet small computer system interface (iSCSI) storage) and the like. The configuration parameters associated with the application may include a desired storage capacity, a desired IO access/seek time/latency, an desired IO queue depth, an expected number of random IO requests, expected number of synchronous writes within a period of time and the like.

The performance monitor module 118, coupled to the performance data collector engine 112 and the performance sizing module 116, monitors the set of combinations of the applications 108A-N and the storage subsystems 104A-N. In one embodiment, the performance monitor module 118 extracts the performance data (e.g., of the set of combinations of the applications 108A-N and the storage subsystems 104A-N) from the performance data collector engine 112 in real time. Further, the performance monitor module 118 compares a subset of the performance data with threshold values. For example, the threshold values correspond to the subset of the performance data and are set by the user or set by the performance sizing module 116. Then, the performance monitor module 118 determines whether the subset of performance data is below or above the threshold values.

Accordingly, the performance monitor module 118 triggers an alarm, email notifications, traps, etc., to notify the user. The performance monitor module 118 also displays performance characteristics associated with the storage systems 104A-N and the applications 108A-N through real time performance charts in a graphical user interface. Additionally, the performance monitor module 118 may display performance deviations in the real time performance charts and trigger notifications when the configuration of any of the storage subsystems 104A-N changes or, one or more of the storage subsystems 104A-N fails.

The performance analyzer module 120 periodically extracts the performance data (e.g., associated with the set of combinations of the applications 108A-N and the storage subsystems 104A-N) from the performance data collector engine 112. In one example embodiment, the performance analyzer module 120 maintains the performance data extracted over a period of time in the internal database 122. Further, the performance analyzer module 120 analyzes the performance data. Based on the analysis, the performance analyzer module 120 generates one or more performance attributes associated with each combination of the applications 108A-N and the storage subsystems 104A-N. For example, the performance attributes may facilitate the user to identify failure areas associated with the storage subsystems 104A-N and the applications 108A-N.

Figure 2:
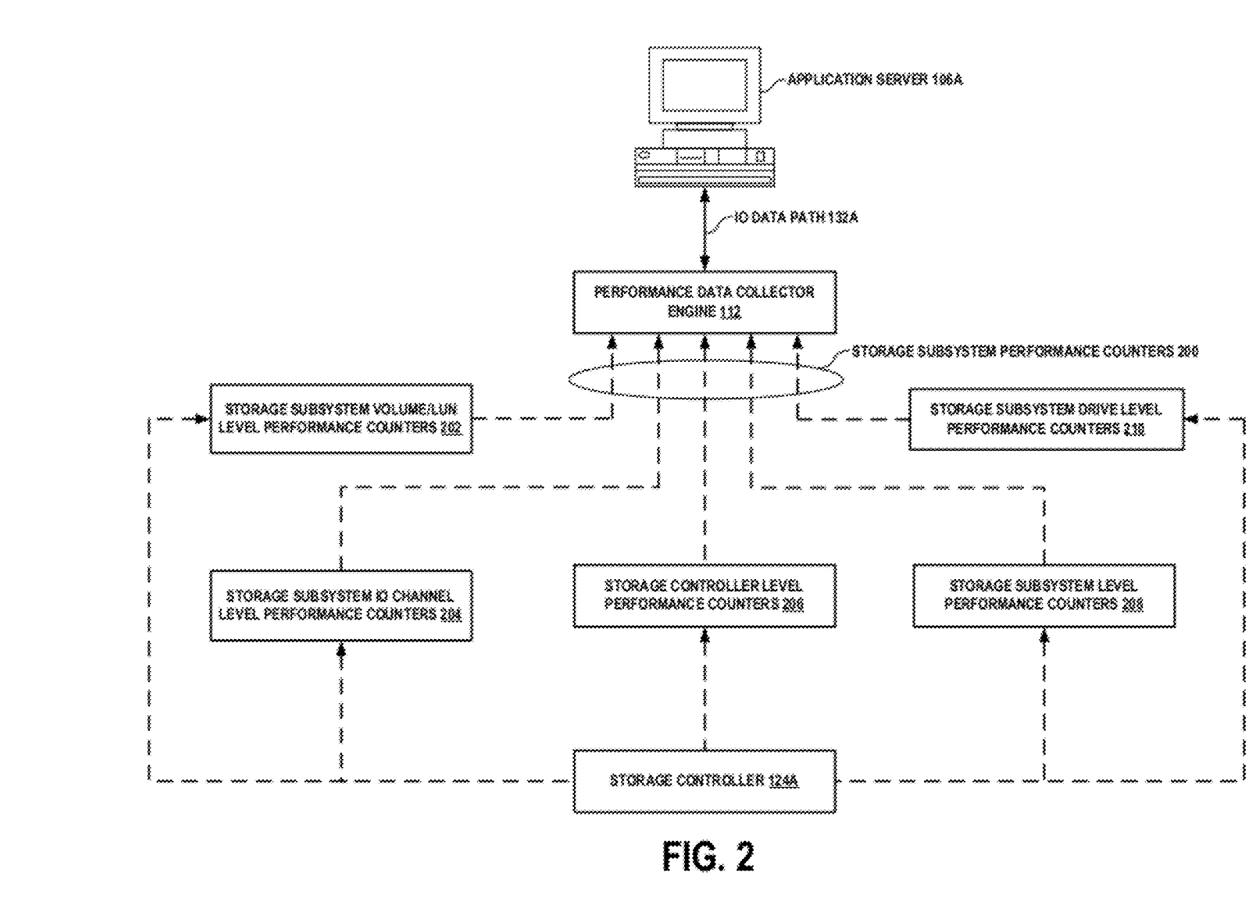
FIG. 2 illustrates exemplary storage subsystem performance counters collected by the performance data collector engine of FIG. 1.

FIG. 2 illustrates exemplary storage subsystem performance counters 200 collected by the performance data collector engine 112 of FIG. 1. As illustrated, the performance data collector engine 112 collects the storage subsystem performance counters 200 by polling the storage controller 124A. In one embodiment, the storage subsystem performance counters 200 govern a performance of a storage subsystem (e.g., the storage subsystem 104A). Various performance counters that constitute the storage subsystem performance counters 200 include storage subsystem volume/logical unit number (LUN) level performance counters 202, storage subsystem IO channel level performance counters 204, storage controller level performance counters 206, storage subsystem level performance counters 208, and storage subsystem drive level performance counters 210.

The storage subsystem volume/LUN level performance counters 202 may include read operation counters, write operation counters, read/write latency counters, idle time counters, and error counters. The storage subsystem IO channel level performance counters 204 may include number of IO operations received on a particular IO channel and executed by the storage controller 124A within the storage subsystem (e.g., the storage subsystem 104A), bytes count transferred into a storage controller's memory from a particular IO channel, bytes count transferred out of the storage controller's memory to a particular IO channel, and idle time counters.

The storage controller level performance counters 206 may include central processing unit (CPU) utilization, storage controller cache utilization, used/available host side bandwidth, used/available target side bandwidth, used/available storage capacity, network bandwidth utilization, storage controller internal cache flush response time, storage subsystem drive IO response time, and host IO response time. The storage subsystem level performance counters 208 may include read operation counters, write operation counters, read/write latency counters, idle time counters, and error counters. The storage subsystem drive level performance counters 210 may include read operation counters, write operation counters, read/write latency counters, idle time counters, and error counters.

Figure 3:
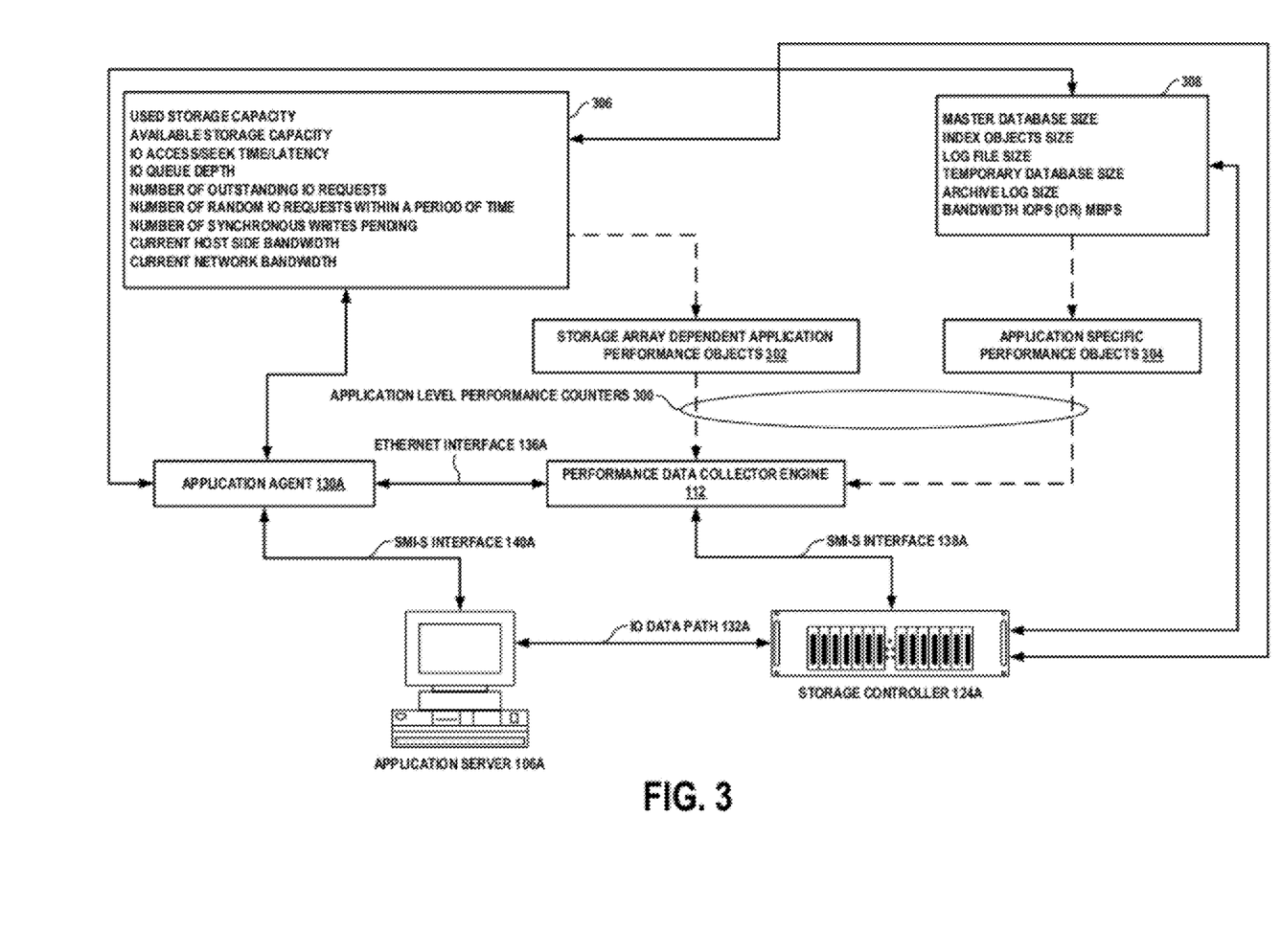
FIG. 3 illustrates exemplary application level performance counters collected by the performance data collector engine of FIG. 1.

FIG. 3 illustrates exemplary application level performance counters 300 collected by the performance data collector engine 112 of FIG. 1. In one embodiment, the performance data collector engine 112 collects the application level performance counters 300 by polling an application server (e.g., the application server 106A) having the application (e.g., a database application in type) using an application agent (e.g., the application agent 130A). The application level performance counters 300 govern a performance of the application.

As illustrated, the application level performance counters 300 include storage array dependent application performance objects 302 and application specific performance objects 304. The storage array dependent application performance objects 302 include a used/available storage capacity, an IO access/seek time/latency, an IO queue depth, a number of outstanding IO requests, a number of random IO requests within a period of time, a number of synchronous writes pending, a current host side bandwidth, and a current network bandwidth (e.g., as illustrated in block 306). Further, the application specific performance objects 304 include a master database size, an index object size, a log file size, a temporary database size, an archive log size, and bandwidth input/output operations per second (IOPS) or mega bytes per second (MBPS) (e.g., as illustrated in block 308).

Figure 4:
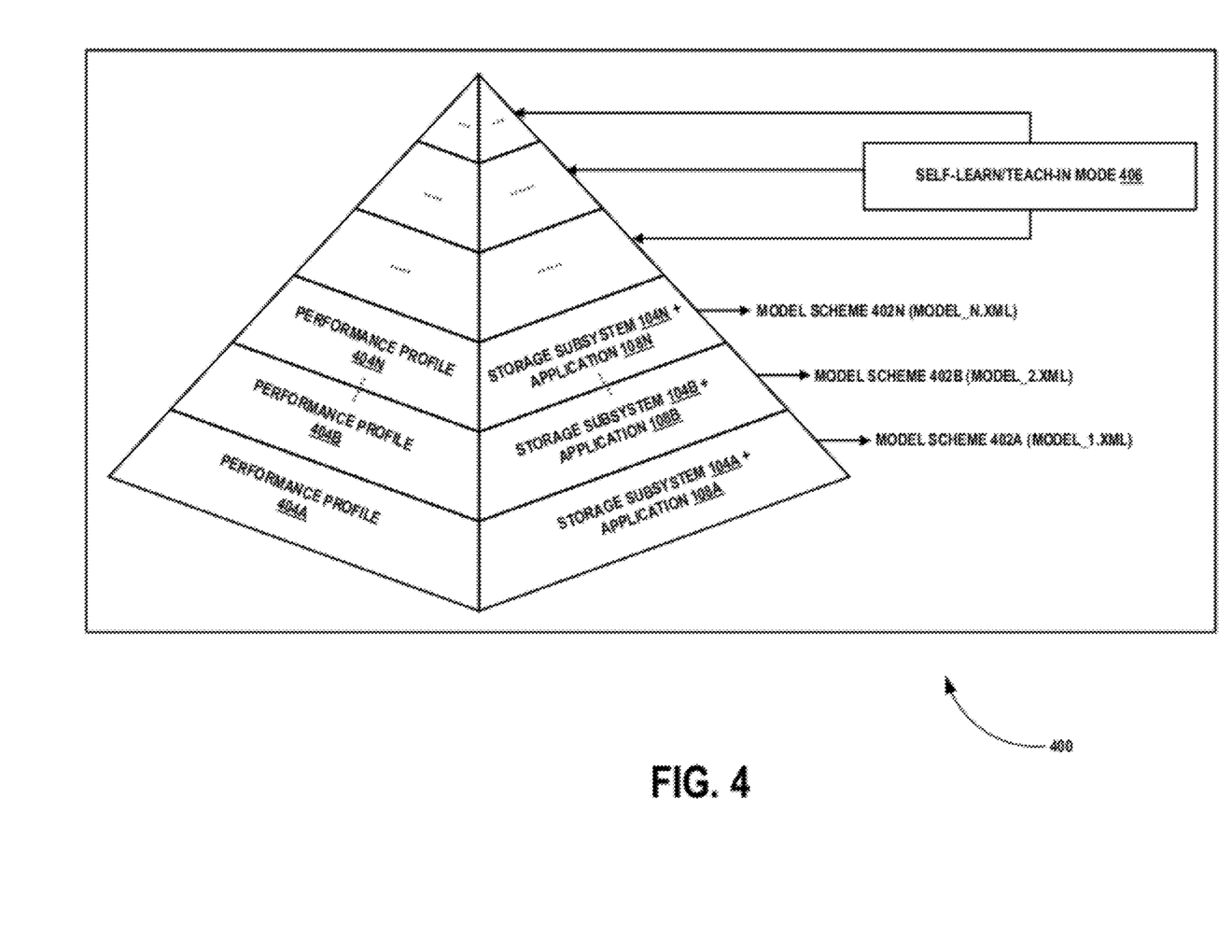
FIG. 4 illustrates an exemplary view of performance profiles generated by the performance modeling module of FIG. 1.

FIG. 4 illustrates an exemplary view 400 of performance profiles 404A-N generated by the performance modeling module 114 of FIG. 1. As illustrated, the performance profiles 404A-N are associated with a set of combinations of the storage subsystems 104A-N and the applications 108A-N in the storage network 100. For example, the performance profile 404A is associated with a combination of the storage subsystem 104A and the application 108A and is represented as a model scheme 402A. Similarly, the performance profile 404N is associated with a combination of the storage subsystem 104N and then application 108N and is represented as a model scheme 402N.

Each of the performance profiles 404A-N may include multiple layers. Further, each of the multiple layers is generated when there is a change in a variable governing the set of combinations of the storage subsystems 104A-N and the applications 108A-N. For example, the variable may include a configuration entity (e.g., database type, drive capacity, RAID level, etc.) for a respective storage subsystem (e.g., the storage subsystem 104A) and a tunable performance parameters (e.g., a master database size, a log file size, a temporary database size, etc.) for a respective application (e.g., the application 108A). Further, the multiple layers are stored as respective templates in extensible markup language (XML) file templates for each one of the performance profiles 404A-N to provide capabilities to interface with third party applications. It can be noted that, the performance profiles 404A-N are coarse in nature when the performance modeling module 114 is initially deployed. Thus, over a period of time, the performance modeling module 114 generates the multiple layers to fine tune the performance profiles 404A-N.

Further, as mentioned above, the performance profiles 404A-N are used for selecting a storage subsystem for a given application coupled to the storage network 100. In one embodiment, one of the performance profiles 404A-N is used for configuring an application and a storage subsystem assigned to the application to obtain desired performance criteria of the application. In one exemplary implementation, respective performance levels of the templates for each of the performance profiles 404A-N are compared and a template with the highest performance level is used to configure the application and the storage subsystem for each performance profile. In addition, the performance modeling module 114 performs a 'self-learn' or 'teach-in' functionality which helps generation of new model schemes when an application and/or storage subsystem are configured in the storage network 100 (as depicted by a self learn/teach-in mode 406).

Figure 5:
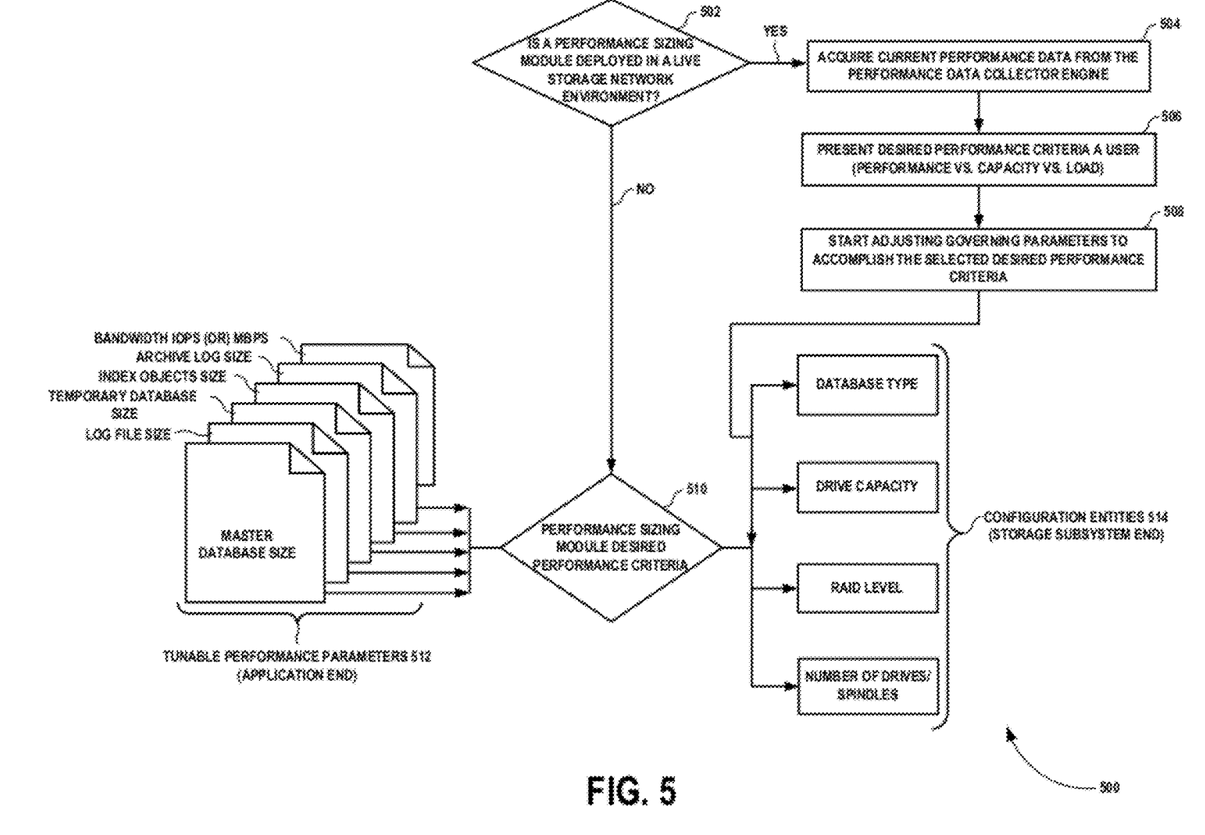
FIG. 5 illustrates an exemplary process performed by the performance sizing module of FIG. 1.

FIG. 5 illustrates an exemplary process 500 performed by the performance sizing module 116 of FIG. 1. In particular, FIG. 5 illustrates the process 500 for a database application. In step 502, it is determined whether the performance sizing tool 116 is deployed in a live storage network environment. In one embodiment, if the performance sizing tool 116 is deployed in the live storage network environment, then the process 500 performs step 504. In step 504, current performance data is acquired from the performance collector engine 112.

The process 500 then performs step 506 where desired performance criteria options are presented to the user. In one example embodiment, the desired performance criteria options include a performance level for a combination of the database application and its counterpart storage subsystem in the live storage network environment, a storage capacity of the storage subsystem, and a loading capability of the combination. In step 508, the process 500 starts adjusting governing parameters to accomplish the desired performance criteria selected by the user.

The governing parameters include configuration entities 514 for the storage subsystem which include a database type, a drive capacity, a RAID level, a number of drives/spindles. By adjusting the governing parameters, the performance sizing module 116 provides a combination of the configuration entities 514 versus tunable performance parameters 512 for the database application. The tunable performance parameters include a master database size, a log file size, a temporary database size, an index object size, and an archive log size. Accordingly, the performance sizing module 116 recommends the configuration entities 514 to configure the database application and the storage subsystem assigned to the database application substantially similar to the selected desired performance criteria (step 510).

Figure 6:
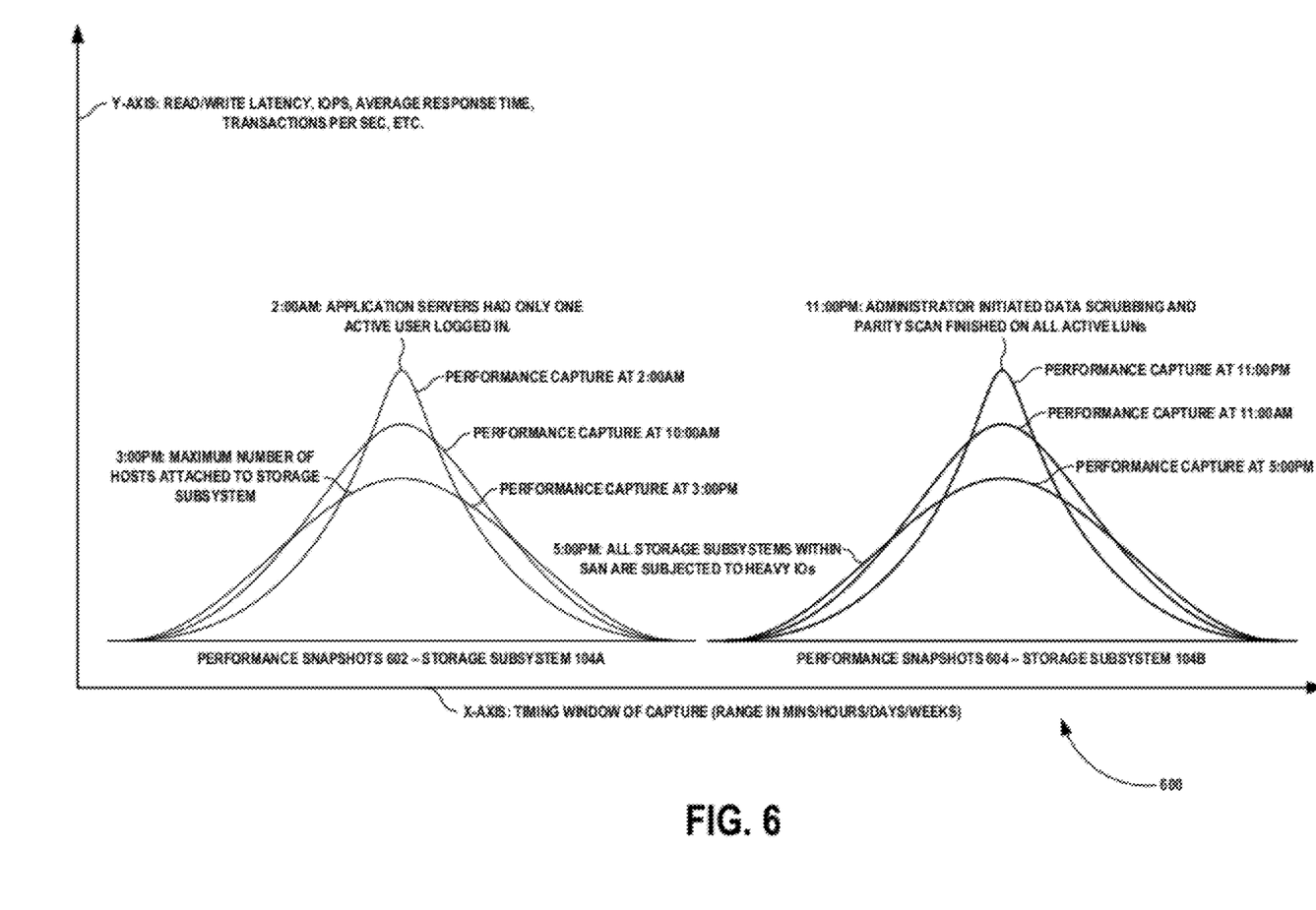
FIG. 6 illustrates an exemplary performance display generated by the performance analyzer module of FIG. 1.

FIG. 6 illustrates an exemplary performance display 600 generated by the performance analyzer module 120 of FIG. 1. Particularly, FIG. 6 illustrates performance snapshots 602 and 604 associated with the storage subsystems 104A and 104B displayed on an X-Y axis. The X axis represents a timing window of capture of the performance data extracted from the performance data collector engine 112. For example, the timing window may range between minutes, hours, weeks, etc. The Y axis represents read/write latency, input/output per second, average response time, transactions per second, etc.

As illustrated, the performance snapshots 602 display three curves. The three curves are based on the performance data captured at different timings, (e.g., 3 pm, 10 am and 2 am). It can be seen from FIG. 6 that, the curve at 3 pm shows a low performance profile compared to the curves at 10 am and 2 am. This is due to fact that maximum number of hosts attached to the storage subsystem 104A at 3 pm. The curve at 2 am shows a highest performance profile as the application servers 106A-N had only one active user logged in at 2 am.

Similarly, the performance snapshots 604 displays three curves based on the performance data captured at different timings such as 5 pm, 11 am and 11 pm. The curve at 11 pm shows a high performance profile as the administrator initiated data scrubbing activity and parity scan on all active LUNs is completed at 11 pm. The curve at 5 pm shows a low performance profile as all storage subsystems 104A-N within the storage network 100 are subjected to heavy IOs.

It can be seen from FIG. 6 that, the performance display 600 displays user information on reasoning and localizing failure areas which have contributed to a low performance level of the storage subsystems 104A and 104B during a timing window of capture of the performance data. Further, the performance snapshots 602 and 604 facilitate the user to analyze best and worse case scenarios for exploring future improvement opportunities at application or storage subsystem level.

Figure 7:
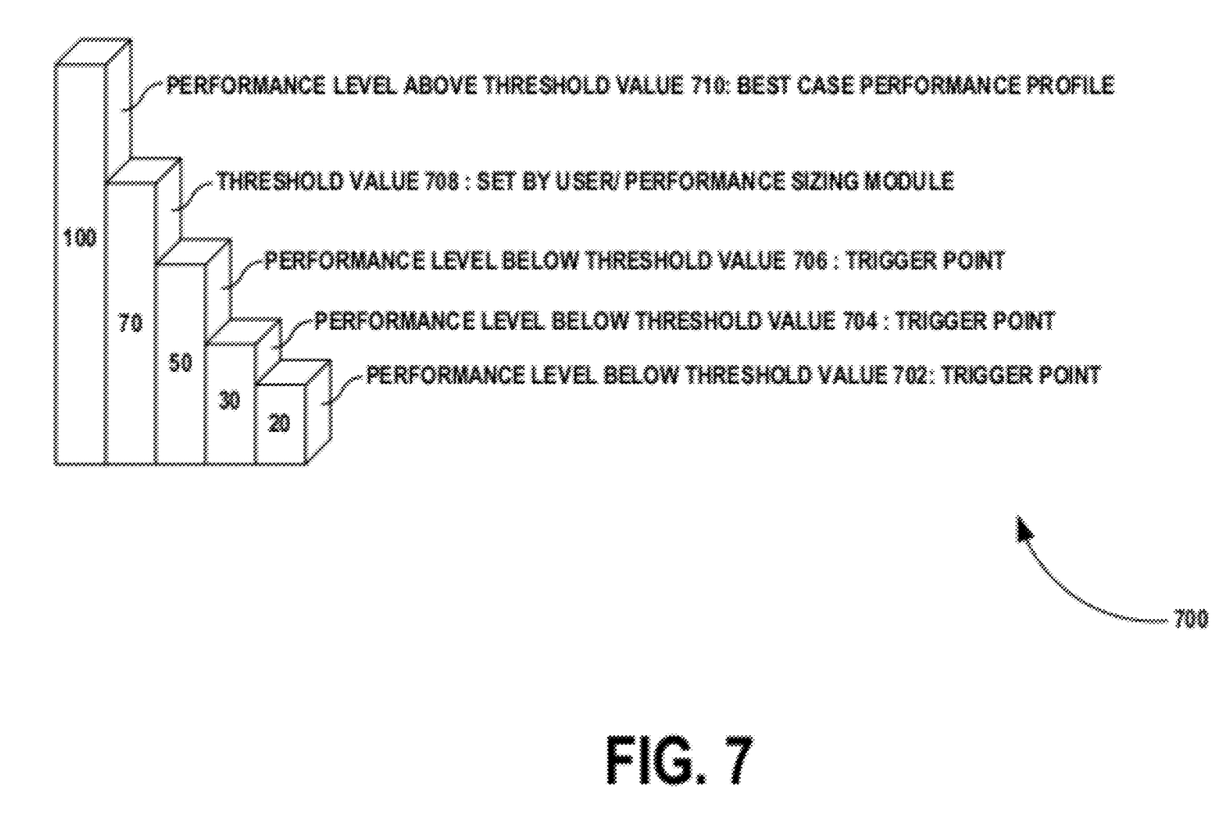
FIG. 7 illustrates an exemplary analytical view generated by the performance monitor module of FIG. 1.

FIG. 7 illustrates an exemplary analytical view 700 generated by the performance monitor module 118 of FIG. 1. In one embodiment, the performance monitor module 118 extracts the performance data from the performance data collector engine 112 and monitors the set of combinations of the applications 108A-N and the storage subsystems 104A-N. In this embodiment, the performance monitor module 118 compares a subset of the performance data with a threshold value (e.g., set by the user or set by the performance sizing module 116) which correspond to the subset of the performance data. Then, the performance monitor module 118 determines whether the subset of performance data is below or above the threshold value.

As illustrated, FIG. 7 displays the comparison performed by the performance monitor module 118 in a bar graph. The set threshold value is indicated by a bar 708. It can be seen that bars 702, 704 and 706 indicate performance levels below the set threshold value. For these performance levels, the performance monitor module 118 triggers an event, an alarm, and a trap in real time. The performance level associated with the bar 710 is above the threshold value 708 and is depicted as a best performance profile.

Figure 8:
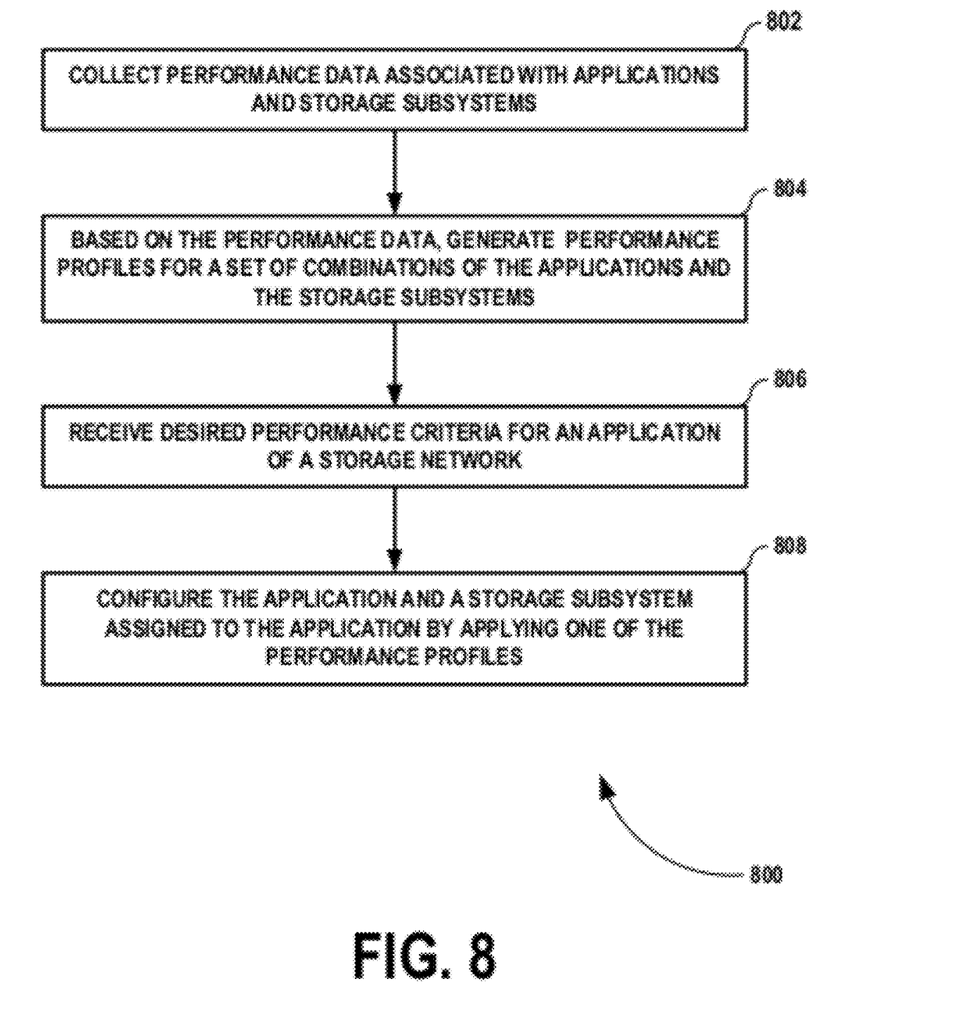
FIG. 8 illustrates a process flow chart of an exemplary unified enterprise level method of a server in a storage network for enhancing application and storage subsystem performance of the storage network, according to one embodiment.

FIG. 8 illustrates a process flow chart 800 of an exemplary unified enterprise level method of a server in a storage network for enhancing application and storage subsystem performance in the storage network, according to one embodiment. In step 802, performance data associated with a plurality of applications and a plurality of storage subsystems is collected. In step 804, a plurality of performance profiles is generated for a set of combinations of the plurality of applications and the plurality of storage subsystems implemented in the storage network based on the performance data.

In step 806, desired performance criteria for an application of the storage network is received. In step 808, one of the plurality of performance profiles is applied to configure the application and a storage subsystem assigned to the application substantially similar to the desired performance criteria. Moreover, in one example embodiment, a computer readable medium for enhancing a performance of a storage network has instructions that, when executed by a server, cause the server to perform the method illustrated in FIG. 8.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuit (ASIC)).

What is claimed is:

1. A method of a server in a storage network for enhancing a performance of the storage network with a plurality of applications and a plurality of storage subsystems, the method comprising:
   collecting performance data associated with the plurality of applications and the plurality of storage subsystems;
   generating a plurality of performance profiles for a set of combinations of the plurality of applications and the plurality of storage subsystems implemented in the storage network based on the performance data, wherein the generating the plurality of performance profiles comprises generating multiple layers for each one of the plurality of performance profiles, wherein each layer is formed when there is a change in at least one variable governing each one of the set of combinations of the plurality of applications and the plurality of storage subsystems;
   receiving desired performance criteria for an application of the storage network; and
   applying one of the plurality of performance profiles to configure the application and a storage subsystem assigned to the application similar to the desired performance criteria.

2. The method of claim 1, wherein the performance data comprise storage subsystem performance counters governing a performance of the storage subsystem and application level performance counters governing a performance of the application.

3. The method of claim 2, wherein the storage subsystem performance counters comprise storage subsystem volume/logical unit number (LUN) level performance counters, storage subsystem input/output (IO) channel level performance counters, storage controller level performance counters, storage subsystem level performance counters, and storage subsystem drive level performance counters.

4. The method of claim 2, wherein the application level performance counters comprise storage subsystem dependent application performance parameters which include a used/available storage capacity, an IO access/seek time/latency, an IO queue depth, a number of outstanding IO requests, a number of random IO requests within a period of time, a number of synchronous writes pending, a current host side bandwidth, and a current network bandwidth; and database application specific performance objects which include a master database size, an index object size, a log file size, a temporary database size, an archive log size, and bandwidth input output operations per second (IOPS) or mega bytes per second (MBPS) when a type of the plurality of applications is a database application.

5. The method of claim 2, wherein the storage subsystem performance counters are collected by polling respective storage controllers of the plurality of storage subsystems, and wherein the application level performance counters are collected by polling respective application servers of the plurality of applications using corresponding application agents.

6. The method of claim 1, wherein the generating the plurality of performance profiles further comprises:
   storing the multiple layers as respective templates for each one of the plurality of performance profiles, and wherein the at least one variable comprises at least one configuration entity for a respective storage subsystem and at least one tunable performance parameter for a respective application.

7. The method of claim 6, wherein the at least one configuration entity comprises a database type, a drive capacity, a redundant array of independent disks (RAID) level, and a number of drives/spindles, and wherein the at least one tunable performance parameter comprises a master database size, a log file size, a temporary database size, an index object size, and an archive log size, provided that a type of the plurality of applications is a database application.

8. The method of claim 6, wherein the applying one of the plurality of performance profiles comprises:
   comparing respective performance levels of the templates for the each one of the plurality of performance profiles; and
   using a template with the highest performance level to configure the application and a storage subsystem.

9. The method of claim 1, wherein the plurality of performance profiles is operable to select one of the plurality of storage subsystems for a given application coupled to the storage network.

10. The method of claim 1, wherein the desired performance criteria comprises a performance level for a combination of an application and a storage subsystem of the storage network, a storage capacity of the storage subsystem, and a loading capability of the combination.

11. The method of claim 1, further comprising generating at least one performance attribute associated with each combination of the plurality of applications and the plurality of storage subsystems by analyzing the performance data.

12. The method of claim 1, further comprising monitoring the set of combinations of the plurality of applications and the plurality of storage subsystems by comparing a subset of the performance data with threshold values which correspond to the subset of the performance data.

13. The method of claim 12, wherein the monitoring the set of combinations further comprises triggering at least one of an event, an alarm, and a trap in real time when the subset of the performance data fall below the threshold values.

14. A server system stored in memory in a storage network for enhancing a performance of the storage network with a plurality of applications and a plurality of storage subsystems, comprising:
   a performance data collector engine configured for collecting performance data associated with the plurality of applications and the plurality of storage subsystems;
   a performance modeling module coupled to the performance data collector engine and configured for generating a plurality of performance profiles for a set of combinations of the plurality of applications and the plurality of storage subsystems implemented in the storage network based on the performance data, wherein the performance modeling module is further configured to generate multiple layers for each one of the plurality of performance profiles, wherein each layer is formed when there is a change in at least one variable governing each one of the set of combinations of the plurality of applications and the plurality of storage subsystems;

a performance sizing module coupled to the performance modeling module and configured for receiving desired performance criteria for an application of the storage network and for applying one of the plurality of performance profiles to configure the application and a storage subsystem assigned to the application similar to the desired performance criteria;

a performance monitor module coupled to the performance data collector engine and configured for monitoring the set of combinations of the plurality of applications and the plurality of storage subsystems by comparing a subset of the performance data with threshold values which correspond to the subset of the performance data; and a performance analyzer module coupled to the performance data collector engine and configured for generating at least one performance attribute associated with each combination of the plurality of applications and the plurality of storage subsystems by analyzing the performance data.

15. The system of claim 14, wherein the storage network comprises a storage area network (SAN) and a network attached storage (NAS).

16. The system of claim 14, wherein the performance data collector engine is coupled to the plurality of storage subsystems via a storage management initiative-standard (SMI-S) interface and polls the plurality of storage subsystems to collect storage subsystem performance counters.

17. The system of claim 14, wherein the performance data collector engine is coupled to application agents associated with the plurality of applications via an Ethernet interface, and wherein the application agents poll the plurality of application servers to collect application level performance counters.

18. The system of claim 14, further comprising an internal database for storing the plurality of performance profiles.

19. The system of claim 18, wherein the storing the plurality of performance profiles is performed via storing the plurality of performance profiles in extensible markup language (XML) file templates.

20. A non-transitory computer readable medium for enhancing a performance of a storage network with a plurality of applications and a plurality of storage subsystems having instructions that, when executed by a server coupled to the storage network, cause the server to perform a method comprising:

collecting performance data associated with the plurality of applications and the plurality of storage subsystems;

generating a plurality of performance profiles for a set of combinations of the plurality of applications and the plurality of storage subsystems implemented in the storage network based on the performance data, wherein the generating the plurality of performance profiles comprises generating multiple layers for each one of the plurality of performance profiles, wherein each layer is formed when there is a change in at least one variable governing each one of the set of combinations of the plurality of applications and the plurality of storage subsystems;

receiving desired performance criteria for an application of the storage network; and applying one of the plurality of performance profiles to configure the application and a storage subsystem assigned to the application similar to the desired performance criteria.

* * * * *